May 26, 1936. J. S. SANTIAGO 2,042,277
SCREEN HOLDER
Filed June 29, 1934 2 Sheets-Sheet 1
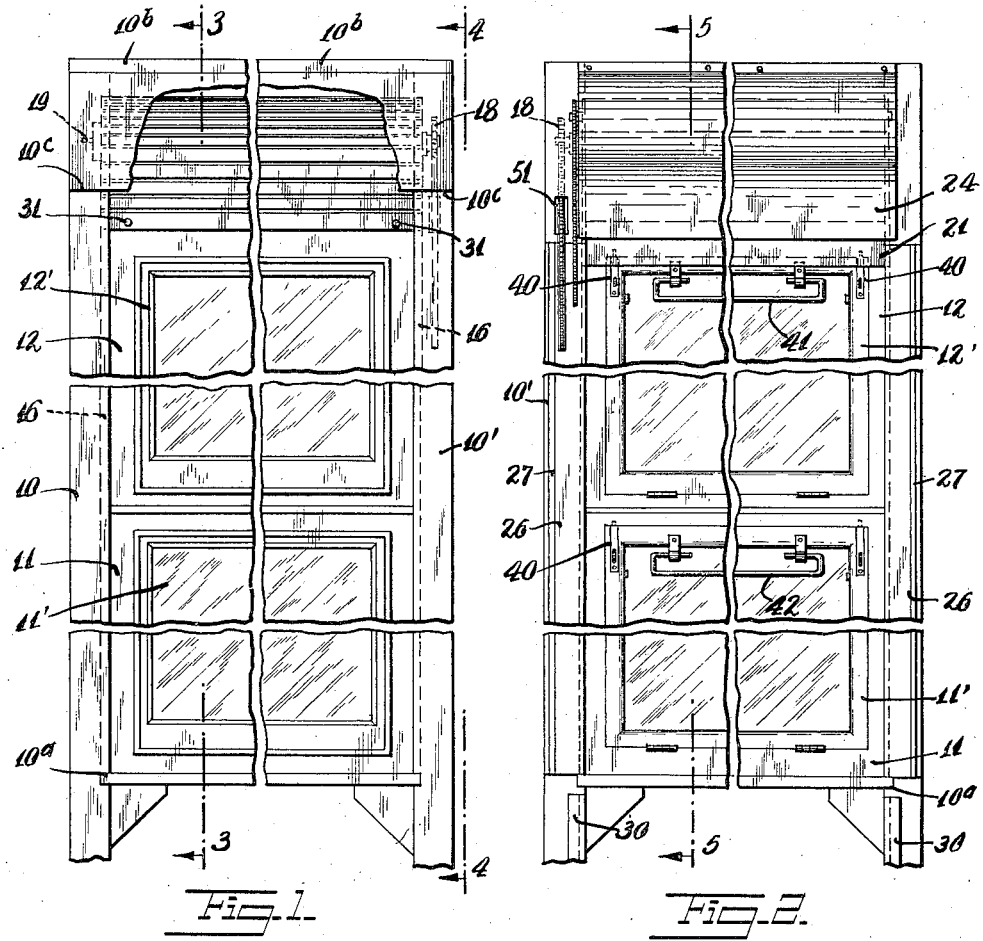
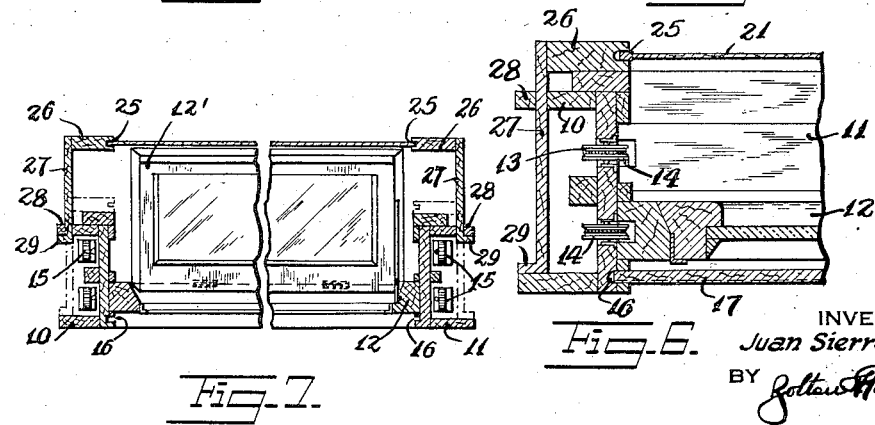
INVENTOR
Juan Sierra Santiago
BY
ATTORNEY May 26, 1936. J. S. SANTIAGO 2,042,277
SCREEN HOLDER
Filed June 29, 1934 2 Sheets-Sheet 2

INVENTOR
Juan Sierra Santiago
BY
ATTORNEY

Patented May 26, 1936

2,042,277

UNITED STATES PATENT OFFICE 2,042,277

SCREEN HOLDER

Juan Sierra Santiago, San Turce, Puerto Rico

Application June 29, 1934, Serial No. 732,974

3 Claims. (Cl. 156—39)

This invention relates to new and useful improvements in a window and screen control.

Still further the invention proposes an arrangement wherein the screen comprises a roll of screen material mounted upon the frame and having its edges engaging in opposed grooves on the frame for guiding the screen across the window, and the provision of a mechanism by which the screen may be raised and lowered.

Still further the invention also proposes an arrangement wherein the screen is also mounted upon a roller on the frame and has its edges engaging opposed grooved strips mounted on the frame for the guiding of the screen from operative to inoperative positions.

Still further the invention contemplates an arrangement wherein the grooved strips which engage the edges of the screen are adjustably mounted in such a manner that the screen may be held at various distances from the window frame, and the areas between the screen and the window frame close automatically when the screen is moved to such adjusted distances.

Still further the invention also proposes an arrangement wherein the screen closes the top and bottom areas produced when the screen is moved from the window frame.

Still further the invention proposes the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is an outside fragmentary elevational view of a window frame with a screen control.

Fig. 2 is an inside elevational view of Fig. 1.

Fig. 6 is a fragmentary enlarged horizontal sectional view taken on the line 6—6 of Fig. 4.

Fig. 7 is a fragmentary horizontal sectional view taken on the line 7—7 of Fig. 5.

Figure 3:
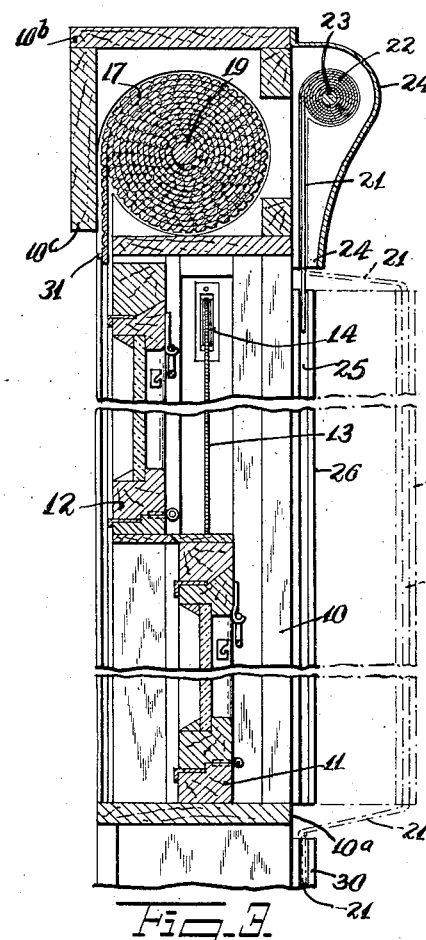
Fig. 3 is a transverse enlarged sectional view taken on the line 3—3 of Fig. 1.
Figure 4:
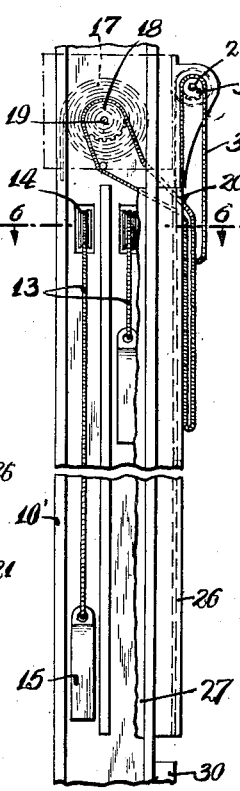
Fig. 4 is a fragmentary elevational view looking in the direction of the line 4—4 of Fig. 1.

The window and screen control according to this invention comprises a window frame consisting of a pair of side arms 10 and 10' held in spaced relation by bottom sill sections 10$^a$ and a top casing 10$^b$. This window frame slidably supports inner and outer window sashes 11 and 12. These window sashes work in grooves upon the inner sides of the window frame, details of which will not be described since such constructions are conventional. The window sashes are conventional. These window sashes are counterbalanced by cables 13 attached to the sashes and extending over rollers 14 mounted upon the window frame. The cables 13 at their inner ends are provided with counter-weights 15. The arrangement is similar to conventional window construction.

The opposite inner sides of the window frame, that is, the opposed sides of the portions 10 and 10' are formed with grooves 16 extending their full lengths, from the top down to the sill portion 10$^a$. A window shade 17 is arranged in a roll and is mounted rotatively in the casing section 10$^b$ of the window frame and has its free end extending downwards in a manner so that the edges of the shade engage the grooves 16.

The arrangement is such that the shade may be unwound for the purpose of extending it down along the grooves 16, and may be retracted when desired.

A mechanism is provided for operating the shade 17 and comprises a gear 18 fixed upon a shaft 19 which supports the slotted blind 17. An endless chain 20 engages over the gear 18 and extends through a suitable opening 51 in the window frame to the inside of the frame. The arrangement is such that the extended side of the endless chain 20 may be drawn in one or the other direction for the purpose of unwinding or winding the window shade.

The screen 21 is wound as indicated at 22 upon a shaft 23 rotative in a cover member 24 secured upon the inner side, at the upper portion of the window frame. The screen 21 extends downwards and has its edges engaging grooves 25 of strips 26 arranged along the sides of the window frame. The strips 26 are attached upon plates 27 which extend through slots 28 in the inner face of the window frame so that the inner edges of the plates are disposed within the window frame. The inner edges of the plates 27 are formed with outturned portions 29 adapted to act as stops so as to limit the possible extension of the plates 27 outwardly, as described later.

The casing 24 is formed with a lower edge 24' arranged immediately above the upper ends of the strips 26. The arrangement is such that when the strips 26 are moved to the extended positions as illustrated by the dot and dash lines in Fig. 5, the screen 21 substantially closes the area between the extended strips and the inner face of the window frame. Stationary grooved strips 30 are attached upon the window frame immediately below the movable strips 26.

Figure 5:
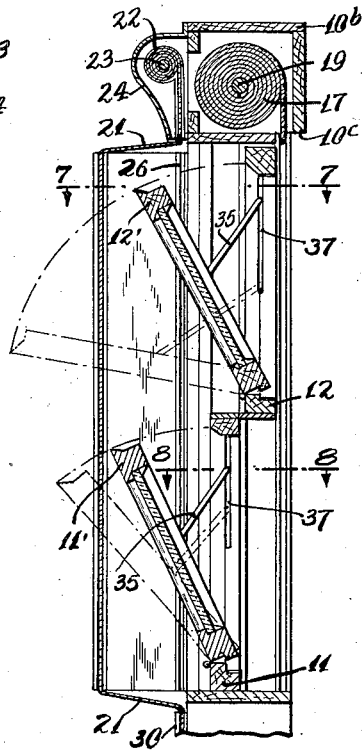
Fig. 5 is a sectional view taken on the line 5—5 of Fig. 2 but illustrating the screen of the device and associated parts in an extended position.
Figure 8:
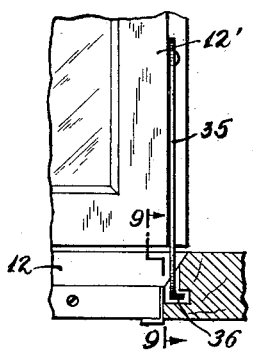
Fig. 8 is a fragmentary enlarged horizontal sectional view taken on the line 8—8 of Fig. 5.
Figure 9:
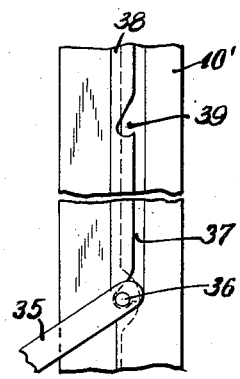
Fig. 9 is a fragmentary elevational view looking in the direction of the line 9—9 of Fig. 8.

The arrangement is such that the lower edge of the screen 21 may be engaged into the grooves and the strips 30 so that when the movable strips 26 are in the extended position as illustrated by the dot and dash lines in Fig. 5, then the screen 21 may close the open area between the extended strips and the inner face of the window frame. The plates 27 maintain any position of adjustment, that is, inward or outward positions, frictionally and must manually be moved into adjusted positions.

A pair of pegs 31 project from the free edge of the slotted blind 17 and are adapted to engage an edge 10c of the casing portion 10b of the window frame so as to prevent the slotted blind from winding up completely so that it disengages from the ends of the grooves 16. With this arrangement the slotted blind may assume an open position, and at all times is ready to assume the closed position wherein its edges are guided by the grooves 16. The shaft 19 is rotatively supported on both ends by reason of rotatively engaging through the arms 10 and 10' of the window frame. Friction is depended upon to hold the slotted blind from unwinding due to its own weight or to winds blowing against it.

The arms 10 and 10' are of hollow construction as clearly illustrated, for example in Figs. 6 and 7 for the purpose of housing the counter-weights 15. The gear 18 is located within one of the arms. The opening 51 connects the interior hollow with the exterior of the arm, and the chain 20 extends through the opening 51 so as to be accessible for operation. The roll of screen 22 has its shaft 23 engaging through the side walls of the casing 24. A gear 33 is fixed upon the shaft 23 and is associated with an endless chain 34 which is extended over the gear in a manner so that the shaft 23 may be turned by moving the endless chain 34 in one direction or the other. The endless chain 34 extends downwards so as to be accessible for the operation of the screen.

The sashes 11 and 12 are formed with window sections 11' and 12' respectively. These window sections are hingedly mounted at their bottom ends. Support rods 35 are pivotally connected intermediate the sides of the window sections and at their other extremities have pegs 36 which engage in grooves 37 formed in the sides of the window frame. A notched plate 38 is engaged over each of the grooves 37 and each plate is arranged in such a manner that the pegs 36 may engage in the notched portions 39 thereof for the purpose of holding the window sections at any desired open position. For example, in Fig. 5 the outer sash is shown open to its extreme position while the inner sash is shown open to an intermediate position. The dot and dash lines show these sashes in other open positions. In these latter mentioned positions it should be noticed that the screen 21 is extended across the sashes so as to screen off the outside atmosphere from the inside. The screen is capable of enclosing the sashes when the latter elements are not fully opened. The reason for this is that according to the design shown on the drawings the plates 27 are of insufficient width to permit sufficient extension to allow the screen to cover the sashes in the fully opened positions of the latter. It is intended that the screen be only used when the sashes are not fully opened. When the sashes are fully opened the screen must be inoperative. If it is required that the screen also be used when the sashes are in the fully opened position, it is merely a matter of design to increase the width of the plates 27 or to reduce the height of the sashes. The window sashes are provided with latches 40 by which they may be latched into their closed positions. Each of the sashes has a handle 42 by which it may be conveniently held and drawn from the closed to the open position, or vice versa.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A device of the character described, comprising a frame having inner and outer sashes slidably mounted and counter-weighted and having hinged window sections adapted to be hingedly opened, said frame having a vertical slit along each side thereof, plates extendable through said slits, a grooved strip along each side of said frame and mounted on said plates, a roll of screen mounted across the top of said frame, means for limiting extension of said plates, said strips adapted to guide the screen, a cover member for the screen portion adjacent the top of said strips and extending across said tops when the strips are in retracted position, and stationary grooved strips continuing from the bottom of said strips for receiving the edge of the screen when completely extended downwards.

2. A device of the character described, comprising a frame having inner and outer sashes slidably mounted and counter-weighted and having hinged window sections adapted to be hingedly opened, said frame having a vertical slit along each side thereof, plates extendable through said slits, a grooved strip along each side of said frame and mounted on said plates, a roll of screen mounted across the top of said frame, means for limiting extensions of said plates, said strips adapted to guide the screen, a cover member for the screen portion adjacent the top of said strips and extending across said tops when the strips are in retracted position, and stationary grooved strips continuing from the bottom of said strips for receiving the edge of the screen when completely extended downwards, said means for limiting extension of the plates comprising inner ends of the plates bent so as to engage the material to the sides of said slits.

3. A device of the character described, comprising a frame having inner and outer sashes slidably mounted and counter-weighted and having hinged window sections adapted to be hingedly opened, said frame having a vertical slit along each side thereof, plates extendable through said slits, a grooved strip along each side of said frame and mounted on said plates, a roll of screen mounted across the top of said frame, means for limiting extension of said plates, said strips adapted to guide the screen, a cover member for the screen portion adjacent the top of said strips and extending across said tops when the strips are in retracted position, and stationary grooved strips continuing from the bottom of said strips for receiving the edge of the screen when completely extended downwards, said grooved strips extending the complete height of the window frame, and said stationary grooved strips being arranged below a window sill of said window frame.

JUAN SIERRA SANTIAGO.